United States Patent Office 3,524,206
Patented Aug. 18, 1970

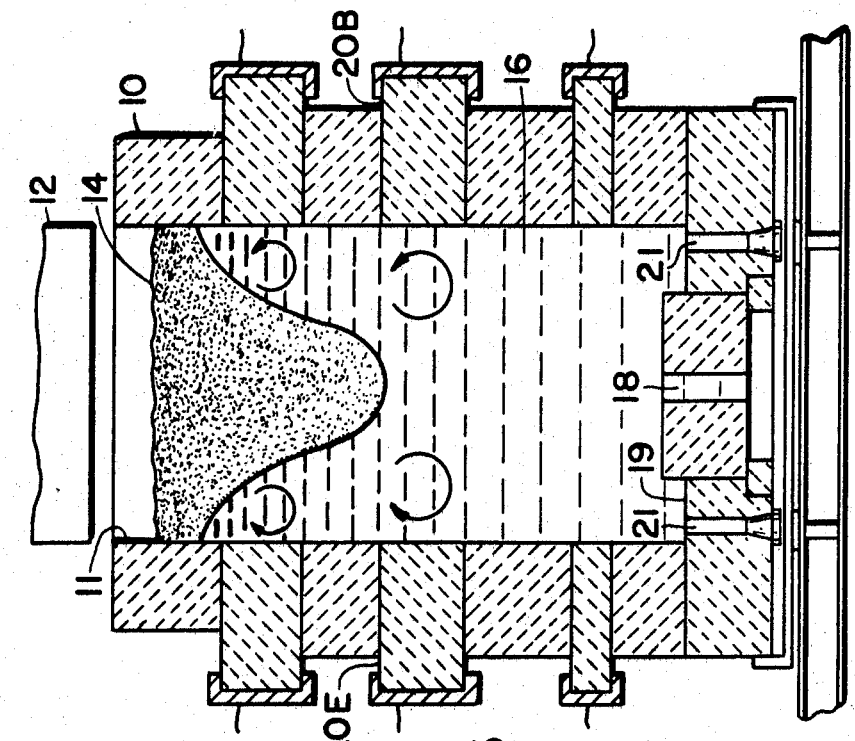
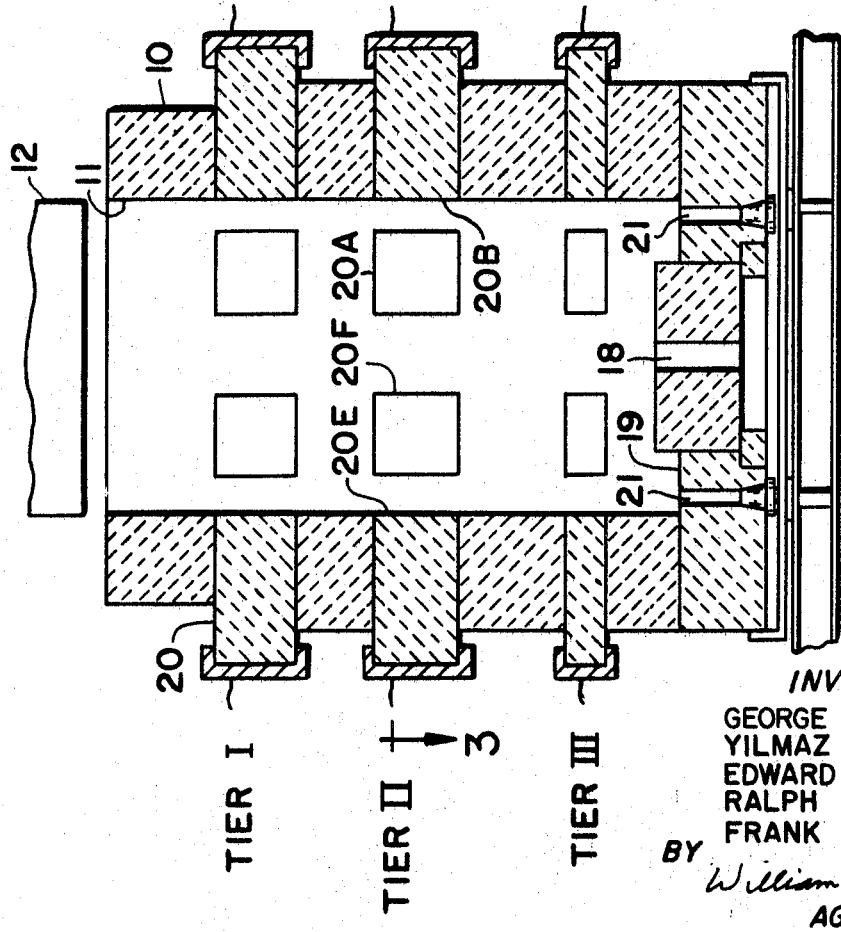
Fig. 1
Fig. 2
INVENTORS.
GEORGE B. BOETTNER
YILMAZ CAN
EDWARD F. FANNING
RALPH E. MILLER
FRANK W. PRESTON
BY
William D. Fosdick
AGENT

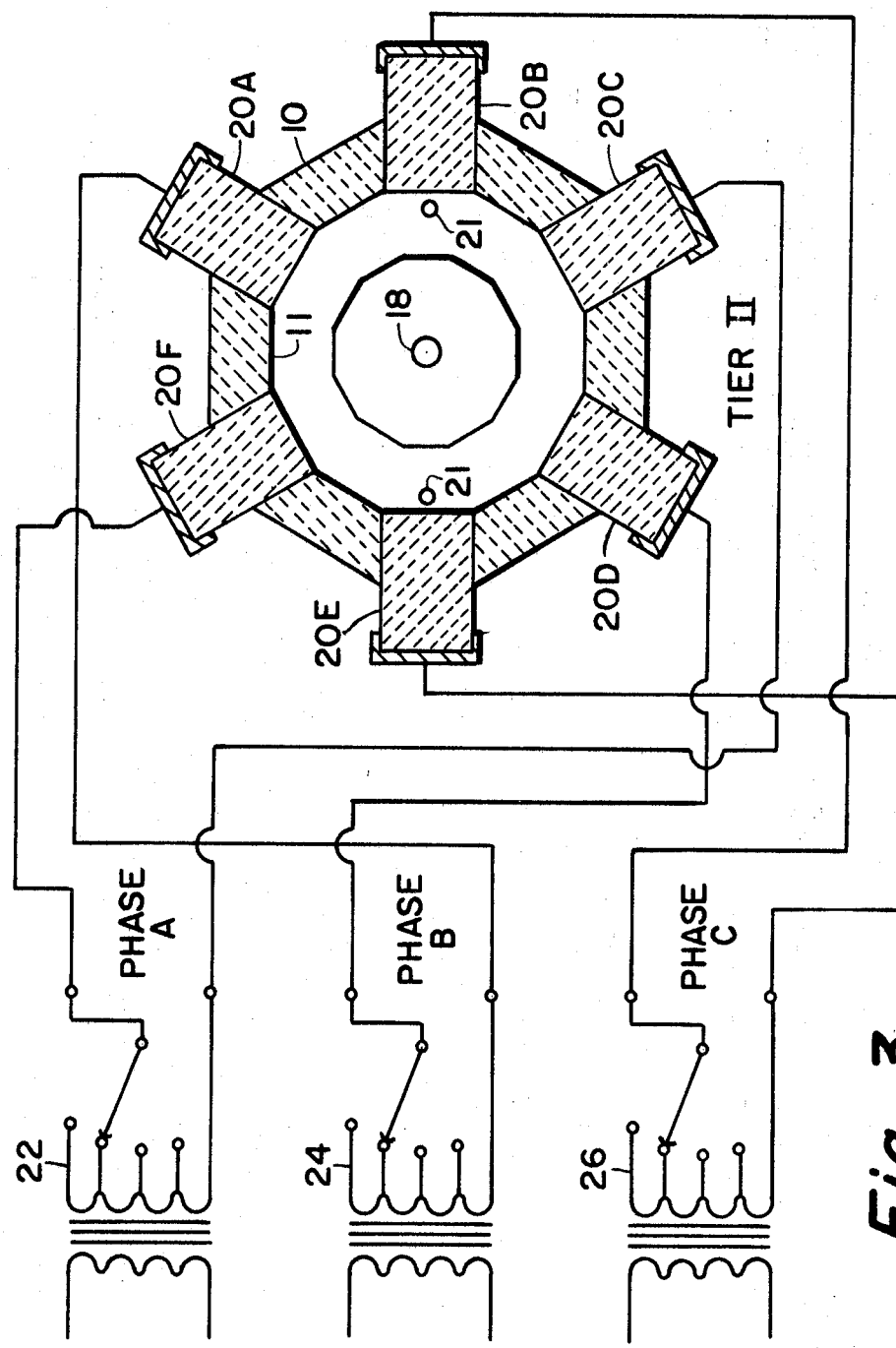

---

3,524,206
METHOD AND APPARATUS FOR MELTING THERMOPLASTIC MATERIALS
George B. Boettner, Yilmaz Can, and Edward F. Fanning, Corning, and Ralph E. Miller, Elmira, N.Y., and Frank W. Preston, Butler, Pa., assignors to Corning Glass Works, Corning, N.Y., a corporation of New York
Filed Apr. 8, 1968, Ser. No. 719,619
Int. Cl. C03b 5/02, 5/16
U.S. Cl. 13—6    5 Claims

ABSTRACT OF THE DISCLOSURE

A vertically elongated furnace for the melting and refining of thermoplastic materials such as glass in which batch is introduced and melted in the upper part of the furnace, refined in a lower part of the furnace and withdrawn through the bottom of the furnace. The batch completely covers the molten material in the furnace and assumes a generally conical form projecting downwardly into the molten material. A plurality of electrodes spaced about the periphery of the furnace supply power for electrically melting the material.

BACKGROUND OF THE INVENTION

In conventional glass melting furnaces the ingredient materials, or batch, from which the glass is formed are generally deposited on the upper surface of the molten glass in the furnace, where they tend to form a covering layer over the molten glass. This batch may comprise both particulate raw materials and cullet. When melting is effected by gas burners, the burners are commonly positioned above the batch and tend to melt the batch from the top downwardly. The melted material trickles down through the unmelted material. In conventional electric glass melting furnaces heat is normally applied to the bottom surface of the batch, and the bottom portion of the batch cover melts first. Entrapped air and released gases percolate up through the unmelted batch. In both types of furnaces the batch cover tends to be relatively uniform in thickness and thus exposes only a small surface to the flames above or to the electrically heated molten material below.

It is an object of the present invention to provide a furnace and a method in which the area of contact between the batch and the heated molten material is maximized, thereby increasing the rate of melting and, as a consequence, the rate at which glass is produced by the furnace.

SUMMARY OF THE INVENTION

According to the invention, increased production rates result from the provision of a furnace in which batch is supplied to the furnace at the top thereof and molten material is withdrawn from the bottom. The heating rate and rate of removal of molten material are such that the unmelted material assumes a generally conical form with the apex of the cone at the bottom of the batch. In a preferred embodiment of the invention heat is applied to the molten material by means of a plurality of tiers of electrodes. The electrodes in each tier are spaced peripherally about the furnace at the same level, and less power is supplied to each tier than to each of the tiers above it.

BRIEF DESCRIPTION OF THE DRAWING

FIG. 1 is a vertical sectional view of a furnace in accordance with a preferred embodiment of the invention.
FIG. 2 is a view similar to FIG. 1 illustrating the furnace filled with batch and molten glass.
FIG. 3 is a sectional view taken on line 3—3 of FIG. 1.

DESCRIPTION OF THE PREFERRED EMBODIMENT

Referring to the drawing, the furnace of the present invention comprises a vertical tank 10 formed of conventional refractory materials. The tank is vertically elongated and has an inner sidewall 11 which in horizontal cross-section forms a twelve-sided polygon approximating a circular configuration. Batch is fed into the furnace through the top of the furnace by means of batch feeder 12, which may be simply a perforate container having means for agitating the batch. The batch forms a batch cover 14 completely covering molten glass 16. The batch is preferably continuously fed into the furnace, and molten glass is continuously withdrawn through outlet 18 at the center of the bottom wall of the furnace. Heat is supplied to the molten glass by means of electric current introduced by three tiers I, II and III each containing six electrodes equally spaced about the periphery of the furnace. Electric power may be supplied to the respective electrodes in the manner illustrated in FIG. 3 in regard to tier II. Electrodes 20A–20F are supplied with power from a three-phase source with the respective phases being connected to opposed pairs of electrodes. The amount of power supplied in each phase is regulated by means of tap transformers 22, 24 and 26. Electric power is supplied to tiers I and III in the same manner as to tier II. Outlet 18 is formed in a raised central portion of the bottom of the furnace, thus forming an annular depression 19 around the periphery of the bottom wall of the furnace. This depression acts as a sump for the collection of eroded refractory material and contaminated glass, which can be removed through drains 21 in the bottom wall of the tank.

In a glass melting furnace in which heat is supplied from beneath the surface of the batch, the rate at which melting takes place is a function not only of the rate at which heat is applied and the velocities of the glass currents adjacents to the batch, but also of the interfacial area between the batch and the molten glass. In the present furnace heat is supplied to the molten glass electrically by the Joule effect. Melting of the batch takes place when heat is transferred from the molten glass to the unmelted batch. Accordingly, increasing the area of contact between the unmelted batch and the molten glass will increase the rate at which heat is diffused into the batch. It is for this reason that the present furnace is designed such that the bottom surface of the batch cover assumes the downwardly convex, generally conical shape illustrated in FIG. 2, thereby forming an interface between the batch and the molten glass having an area substantially greater than the horizontal cross-sectional area of the tank. It is desirable that the cone project a substantial distance into the melting area of the furnace, which area is the upper area, but that projection be limited such that no unmelted batch reaches the lower part of the furnace in the vicinity of the outlet, where refining of the glass takes place. Preferably the height of the interfacial area of the cone is at least 0.3 of the inner diameter of the tank but not greater than the inner diameter of the tank. If the batch cover is elongated by great enough distance, portions of the tip of the cone may break off and float upwardly in the melting area of the furnace, thereby further increasing the total interfacial area between the molten glass and the batch. In general, however, the length of the cone is stable. This results from the fact that the electric currents from the electrodes of tiers I and II travel both around the sides of the unmelted batch and under the bottom. As the cone elongates, there is a tendency for the current passing below the tip to become more concentrated near the tip, thereby increasing the temperature in this area and increasing the rate of melting, tending to shorten the cone. Similarly, as the length of the cone decreases, the electric current passing below the tip becomes less concentrated, thereby decreasing the rate of melting and increasing cone length. Thus, the cone is in a state of stable equilibrium.

The conical configuration of the batch results from a combination of factors. One such factor is the tendency of the sidewall of the tank to inhibit the downward movement of the batch in the vicinity of the wall. This inhibition is due both to friction between the wall and the batch above tier I and the fact that the peripheral material near the top of the sidewall above tier I tends to be cooler than that near the center of the tank due to heat loss through the top of the wall. Another factor is the high electrical current concentration existing immediately in front of the electrodes, producing melting temperatures at the sides of the tank in the electrode area higher than the temperatures at the center of the same area. In addition, there is a tendency for the convection currents, indicated by the arrows in FIG. 2, to push upwardly against the batch in the vicinity of the sidewall. Furthermore, withdrawal of the molten glass from the centrally located outlet tends to maintain cone symmetry.

The batch cover extends over the entire top surface of the molten glass. The result of this is both to minimize the loss of heat from the top of the furnace and also to prevent the cone from tipping. The upper portion of the cone is lighter than the lowermost portion since it is less compact and is not subject to partial fusion as is the lowermost portion. Accordingly, the upper portion acts as a float, thus preventing the cone from overturning.

As previously mentioned, refining of the molten glass takes place in the lowermost portion of the furnace. Accordingly, power is supplied to the electrodes of tier III primarily during initial operation of the furnace, and subsequently a quiescent zone is maintained in this part of the furnace permitting refinement of the glass. This quiescent zone results from the fact that the temperature of the molten glass in the bottom part of the tank is substantially uniform horizontally, while a vertical temperature gradient exists in this part of the tank, the coolest glass being in the vicinity of the bottom wall.

Power is preferably supplied to tier I at a greater rate than to tier II. As a result, the glass in the upper portion of the melting zone of the furnace in the vicinity of tier I is maintained at a hotter temperautre than that in the vicinity of tier II, thereby counteracting any tendency for convection currents to cause the glass from the area of tier II to move upwardly to the area of tier I. The result is that two separate convection zones are produced, as illustrated by the arrows in FIG. 2, thereby producing greater turbulence than would result from a single convection current and, as a consequence, more rapid melting. It has been found that, optimally, electric power should be supplied to tier I at a rate between one and one-half and three times the rate at which power is supplied to tier II, although other ratios may be used. The provision of two tiers of operating electrodes not only permits the maintenance of plural convection currents but also results in increased electrode life. If more than two tiers of electrodes are used during glass production, power is preferably supplied to each tier at a rate higher than to each tier below it.

As glass temperature increases, the electrical resistance of the glass decreases, and, as a consequence, at constant voltages the power input increases. Thus, in turn, raises the temperature still further and increases the power input still further. In order to avoid this unstable arrangement, it has been found advantageous to regulate the power input, particularly in tier I, rather than to regulate temperature. By controlling power input and maintaining it at a steady level, it is possible to get quicker and more accurate control than is obtainable by attempting to adjust the power so as to get a uniform temperature.

In a furnace of the present type which is 3 feet in inner diameter and 6 feet in depth, a total power of approximately 230 killowatts is needed to melt glass at about 1450° C. at the rate of about 7 pounds per minute.

It will be noted that the inner surface of the sidewall of the present furnace is substantially symmetric about a central vertical axis and approximately circular in horizontal cross-section and that the outlet from the furnace is on the axis of symmetry. This arrangement contributes to uniformity of melting and flow. In conventional furnaces, the rate at which glass is withdrawn is limited by the time taken by the fastest moving glass in reaching the outlets, inasmuch as all glass produced must remain in the furnace for a time sufficient to insure complete melting and refining. Consequently, in conventional furnaces the slower moving glass must remain in the furnace for a time longer than necessary, thereby decreasing production rates. Due to the substantially horizontally uniform temperature in the lower part of the present furnace glass tends to flow through the lower part of the furnace at nearly the same rate, and this inefficiency is avoided. For optimum performance it is desirable that the horizontal cross-section of the present furnace approximate a circular configuration. Unformity of temperature is further enhanced due to the fact that the walls of the furnace are of substantially constant thickness, resulting in uniform heat loss through the walls to the surrounding atmosphere.

Although it is preferable that the inner surface of the present furnace be approximately circular, other configurations may be used. For example, square or triangular configurations may be employed. Furthermore, the cross-sectional area of the tank may vary at differing heights.

Since the unmelted batch is not initially electrically conducting, the furnace may be started by use of conventional gas burners. Furthermore, the invention is not limited to furnaces employing electrical heating, inasmuch as heat may be supplied to the molten glass below the batch by other means, such as gas burners.

Inasmuch as the foregoing description has been provided solely as that of the preferred embodiment of the invention, the scope of the invention is not to be limited thereby but is intended to be limited only by the scope of the appended claims. It will be understood that the term "cone" and variations thereof are used in the claims to refer to shapes generally resembling cones and not to precise geometric configurations.

What is claimed is:

1. A furnace for the melting of thermoplastic material, said furnace comprising
    a vertically elongated tank,
    batch feeder means for supplying batch to an upper part of said tank,
    electrode means for applying heat energy around the periphery of said tank at a plurality of heights to melt said material in said upper part of said tank,
    control means for supplying electric power at each height at a rate greater than that supplied at each height therebelow,
    a lower part of said tank forming a refining zone for refining said thermoplastic material subsequent to being melted in said upper part of said tank, and
    outlet means formed in the bottom of said tank for withdrawing said thermoplastic material from said lower part of said tank subsequent to the refinement thereof.

2. A furnace according to claim 1 in which said tank has a bottom wall with an annular well extending around its periphery at the base of said sidewall.

3. A furnace according to claim 1 in which each said means for supplying electric power is a supply of three-phase electric power.

4. A method of melting and refining thermoplastic material which comprises the steps of introducing batch of such material into an upper portion of a tank, applying heat energy about the periphery of said tank at a plurality of heights to melt said batch and form molten thermoplastic material, regulating the rate of heat energy applied to each height such that each height is supplied with a greater rate of heat energy than that supplied at each height therebelow, refining said molten thermoplastic material at a level below that at which it is melted, and withdrawing said molten thermoplastic material from said tank, below the position where it is refined, subsequent to both the melting and refining thereof.

5. A method of melting and refining thermoplastic material as defined in claim 4 wherein the batch material is introduced into the tank to form a continuous blanket across the top of the molten thermoplastic material, and a generally conical body of said batch material is maintained extending downwardly into the molten material in said tank.

References Cited

UNITED STATES PATENTS

| 2,186,718 | 1/1940 | Ferguson. | |
| 2,283,188 | 5/1942 | Cornelius | 13—6 |
| 2,744,152 | 5/1956 | White. | |
| 2,993,079 | 7/1961 | Augsburger | 13—6 |
| 1,820,248 | 8/1931 | Raeder | 13—6 |
| 2,263,549 | 11/1941 | Peyches | 219—288 |

H. B. GILSON, Primary Examiner

U.S. Cl. X.R.

13—9, 20